United States Patent
Kawano et al.

(10) Patent No.: US 11,345,777 B2
(45) Date of Patent: May 31, 2022

(54) EPOXY RESIN, EPOXY RESIN COMPOSITION, EPOXY RESIN COMPOSITION FOR CARBON FIBER-REINFORCED COMPOSITE MATERIAL, PREPREG, AND CARBON FIBER-REINFORCED COMPOSITE MATERIAL

(71) Applicant: NIPPONKAYAKU KABUSHIKI KAISHA, Tokyo (JP)

(72) Inventors: Yusuke Kawano, Tokyo (JP); Masataka Nakanishi, Tokyo (JP); Kazuma Inoue, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/056,423

(22) PCT Filed: Jul. 23, 2019

(86) PCT No.: PCT/JP2019/028749
§ 371 (c)(1),
(2) Date: Nov. 18, 2020

(87) PCT Pub. No.: WO2020/022301
PCT Pub. Date: Jan. 30, 2020

(65) Prior Publication Data
US 2021/0206907 A1     Jul. 8, 2021

(30) Foreign Application Priority Data
Jul. 24, 2018 (JP) .............................. JP2018-138138

(51) Int. Cl.
| | | |
|---|---|---|
| C08J 5/24 | (2006.01) | |
| C08L 63/04 | (2006.01) | |
| C08G 59/32 | (2006.01) | |
| C08G 59/62 | (2006.01) | |
| C08G 59/20 | (2006.01) | |
| C08K 3/04 | (2006.01) | |
| C08K 7/06 | (2006.01) | |

(52) U.S. Cl.
CPC ........... *C08G 59/621* (2013.01); *C08G 59/20* (2013.01); *C08J 5/24* (2013.01); *C08K 3/04* (2013.01); *C08K 7/06* (2013.01); *C08J 2363/04* (2013.01)

(58) Field of Classification Search
None
See application file for complete search history.

(56) References Cited

U.S. PATENT DOCUMENTS 9,738,783 B2    8/2017   Liang et al.
2016/0208091 A1*  7/2016   Liang ..................... C08G 59/08

FOREIGN PATENT DOCUMENTS

| JP | S61055113 | | 3/1986 | |
| JP | 62212410 A | * | 9/1987 | ............... C08G 8/10 |
| JP | H02070721 | | 3/1990 | |
| JP | 2001096926 | | 4/2001 | |
| JP | 2003026761 | | 1/2003 | |
| JP | 5579300 | | 8/2014 | |
| WO | 2020204173 | | 10/2020 | |

OTHER PUBLICATIONS

Machine translation of JP-62212410-A (no date).*
"International Search Report (Form PCT/ISA/210)"of PCT/JP2019/028749, dated Oct. 15, 2019, with English translation thereof, pp. 1-4.
"Search Report of Europe Counterpart Application", dated Mar. 4, 2022, p. 1-p. 6.

* cited by examiner

Primary Examiner — Michael J Feely
(74) Attorney, Agent, or Firm — JCIPRNET

(57) ABSTRACT

Provided are an epoxy resin composition, a prepreg, a resin sheet, and a carbon fiber-reinforced composite material, which have high heat resistance, a high elastic modulus, low water absorption, and excellent flame resistance. This epoxy resin is a para-cresol novolac epoxy resin represented by General formula (1), in which a content ratio of components represented by n=1 as measured by gel permeation chromatography is less than 10% by area, and a content ratio of components represented by n=2 as measured by gel permeation chromatography is at least 1% by area and less than 40% by area.

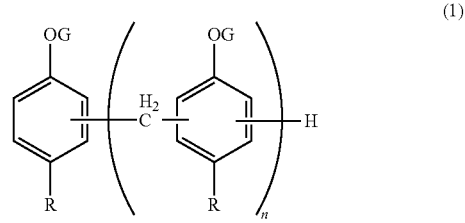

(In the formula, plural R's each independently represent a C1-6 alkyl group, n represents a real number of 1 to 10, and G represents a substituted or unsubstituted glycidyl group.)

13 Claims, 2 Drawing Sheets

EPOXY RESIN, EPOXY RESIN COMPOSITION, EPOXY RESIN COMPOSITION FOR CARBON FIBER-REINFORCED COMPOSITE MATERIAL, PREPREG, AND CARBON FIBER-REINFORCED COMPOSITE MATERIAL

CROSS-REFERENCE TO RELATED APPLICATION

This application is a 371 of international application of PCT application serial no. PCT/JP2019/028749, filed on Jul. 23, 2019, which claims the priority benefit of Japan application no. 2018-138138, filed on Jul. 24, 2018. The entirety of each of the abovementioned patent applications is hereby incorporated by reference herein and made a part of this specification.

BACKGROUND OF THE INVENTION

Technical Field

The present invention relates to an epoxy resin suitable for a carbon fiber-reinforced composite material, an epoxy resin composition, a prepreg in which these are used, and the carbon fiber-reinforced composite material obtained by curing the prepreg.

Related Art

An epoxy resin is cured with various curing agents to become a cured product having excellent mechanical properties, water resistance, chemical resistance, heat resistance, electrical properties, and the like, and is used in a wide range of fields such as an adhesive, a coating material, a laminated plate, a molding material, and a casting material. Since a carbon fiber-reinforced composite material (CFRP) obtained by impregnating an epoxy resin and a curing agent into reinforced fibers as a matrix resin and curing it can impart characteristics such as weight reduction and high strength, it has been recently widely developed for computer applications such as a member for an aircraft structure, a blade of a windmill, an automobile outer plate, and a housing for an IC tray or a notebook computer, and demand therefor is increasing. In particular, a carbon fiber-reinforced composite material is used in a matrix resin for aircraft applications by making use of characteristics such as weight reduction and high strength of a molded body thereof.

In general, materials such as a bisphenol A-type epoxy resin, a bisphenol F-type epoxy resin, and tetraglycidyl diaminodiphenylmethane are used as resins used in matrix resins such as a CFRP. In addition, glycidyl amine type epoxy resins such as tetraglycidyl diaminodiphenylmethane are used in aircraft applications.

In recent years, characteristics required for a CFRP have become stricter, and in a case where a CFRP is applied to structural materials for aerospace applications or vehicles, heat resistance at 180° C. or higher is required (Patent Literature 1). Although a glycidyl amine-based material has a high heat resistance, it has problems of a high water absorption rate and deterioration in characteristics after water absorption. On the other hand, a general glycidyl ether epoxy resin has a relatively low water absorption rate, but it has a problem of a low elastic modulus. For this reason, a material having high heat resistance, a high elastic modulus, and a low water absorption rate is required. In addition, there is a strong demand for flame retardancy in aerospace applications from the viewpoints of safety and reliability.

As one of the known epoxy resins in the related art, there is an epoxy resin using a para-cresol novolac as a raw material (Patent Literature 2). Although there is a disclosure in Patent Literature 2 that an epoxy resin containing 40 weight % or more of a trinuclear para-cresol component has excellent fluidity and heat resistance in semiconductor sealing applications, there is no disclosure of other characteristics thereof or usefulness for carbon fiber-reinforced composite material applications.

In addition, a trinuclear para-cresol novolac body has also been developed (Patent Literature 3). However. Patent Literature 3 is about developer applications for thermosensitive recording materials, and does not disclose heat resistance of an epoxy resin-cured product, various physical properties such as mechanical strength, or usefulness for carbon fiber-reinforced composite material applications.

LITERATURE OF RELATED ART

Patent Literature

Patent Literature 1

PCT International Publication No. WO 2010/204173

Patent Literature 2

Japanese Patent No. 5579300

Patent Literature 3

Japanese Patent Laid-Open No. 2001-96926

SUMMARY

Technical Problem

The present invention has been made in consideration of the above-described problems in the related art, and an objective of the present invention is to provide an epoxy resin of which a cured product has a high elastic modulus, an epoxy resin composition, a prepreg, a resin sheet, and a carbon fiber-reinforced composite material.

Solution to Problem

The present inventors have conducted extensive studies, and as a result, have found that a cured product of an epoxy resin composition consisting of a para-cresol novolac epoxy resin having a specific structure has a high elastic modulus, thus leading to realization of the present invention.

That is, the present invention is shown in the following [1] to [11].

[1] An epoxy resin which is a para-cresol novolac epoxy resin represented by General Formula (1), in which a content ratio of components represented by n=1 as measured by gel permeation chromatography is less than 10% by area and a content ratio of components represented by n=2 as measured by gel permeation chromatography is at least 1% by area and less than 40% by area.

[Chem. 1]

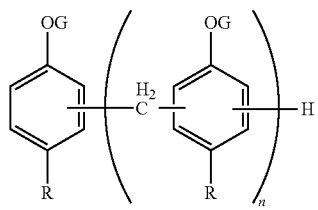

(1)

(In the formula, plural R's each exist independently and represent a C1-6 alkyl group, n represents a real number of 1 to 10, and G represents a substituted or unsubstituted glycidyl group.)

[2] An epoxy resin which is a para-cresol novolac epoxy resin represented by General Formula (1), in which a total content of components represented by n=1 and 3 as measured by gel permeation chromatography is at least 1% by area and less than 20% by area and a total content of components represented by n=2 and 4 as measured by gel permeation chromatography is at least 10% by area and less than 50% by area.

[Chem. 2]

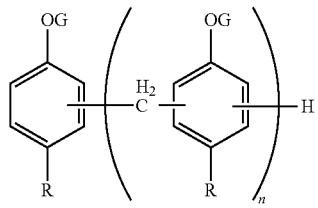

(1)

(In the formula, plural R's each exist independently and represent a C1-6 alkyl group, n represents a real number of 1 to 10, and G represents a substituted or unsubstituted glycidyl group.)

[3] The epoxy resin according to [1] or [2] obtained through a reaction between epihalohydrins and para-cresol novolacs represented by General Formula (2).

[Chem. 3]

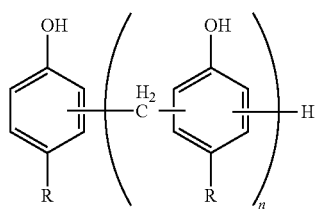

(2)

(In the formula, plural R's each exist independently and represent a C1-6 alkyl group and n represents a real number of 1 to 10.)

[4] The epoxy resin according to [3], in which, in the para-cresol novolacs represented by General Formula (2), a content ratio of components represented by n=1 as measured by gel permeation chromatography is less than 10% by area and a content ratio of components represented by n=2 as measured by gel permeation chromatography is at least 10% by area and less than 50% by area.

[5] The epoxy resin according to [3], in which, in the para-cresol novolacs represented by General Formula (2), a total content of components represented by n=1 and 3 as measured by gel permeation chromatography is at least 1% by area and less than 30% by area and a total content of components represented by n=2 and 4 as measured by gel permeation chromatography is at least 20% by area and less than 65% by area.

[6] An epoxy resin composition including: the epoxy resin according to any one of [1] to [5]; and a curing agent.

[7] The epoxy resin composition according to [6], in which the curing agent is a phenolic curing agent.

[8] The epoxy resin composition according to [6] or [7], which is for a carbon fiber-reinforced composite material.

[9] A resin sheet obtained by coating a support base with the epoxy resin composition according to any one of [6] to [8].

[10] A prepreg obtained by impregnating the epoxy resin composition according to any one of [6] to [8] or the resin sheet according to [9] into carbon fibers.

[11] A carbon fiber-reinforced composite material obtained by curing the prepreg according to [10].

Advantageous Effects of Invention

According to the present invention, it is possible to provide an epoxy resin composition of which a cured product has a high elastic modulus, a resin sheet, a prepreg, and a carbon fiber-reinforced composite material using the same.

DESCRIPTION OF THE EMBODIMENTS

Figure 1:
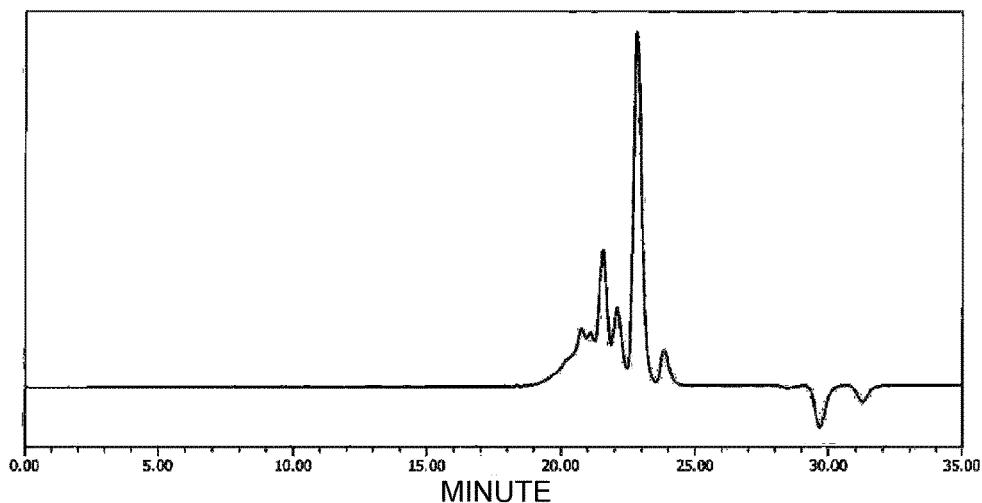
FIG. 1 shows GPC measurement results of a para-cresol novolac (PCN-1) obtained in Synthesis Example 2.
Figure 2:
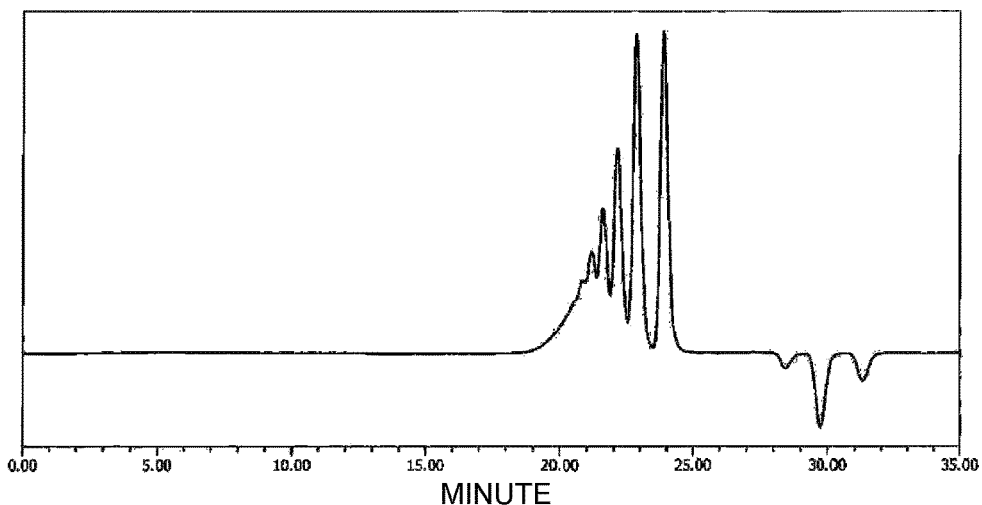
FIG. 2 shows GPC measurement results of a para-cresol novolac (PCN-7) obtained in Synthesis Example 8.
Figure 3:
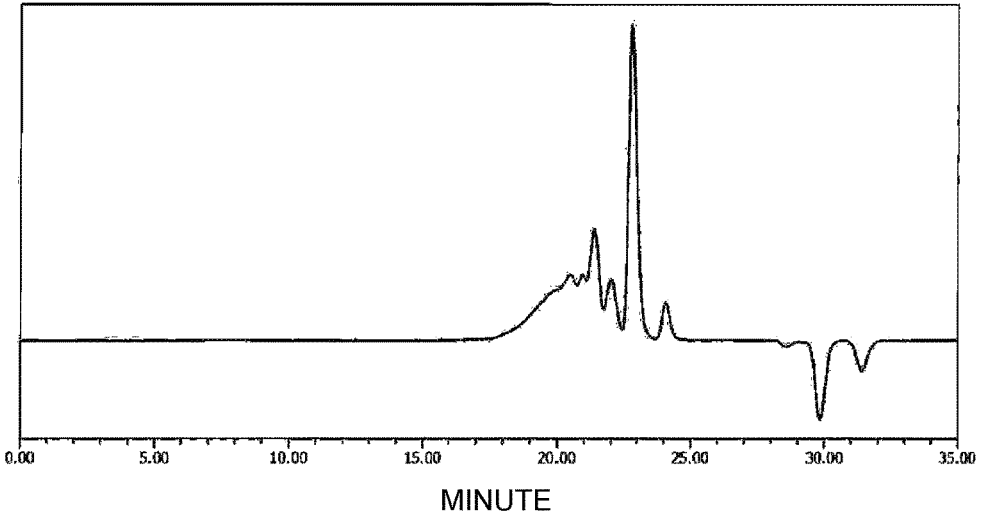
FIG. 3 shows GPC measurement results of an epoxy resin (EP-1) obtained in Example 1.
Figure 4:
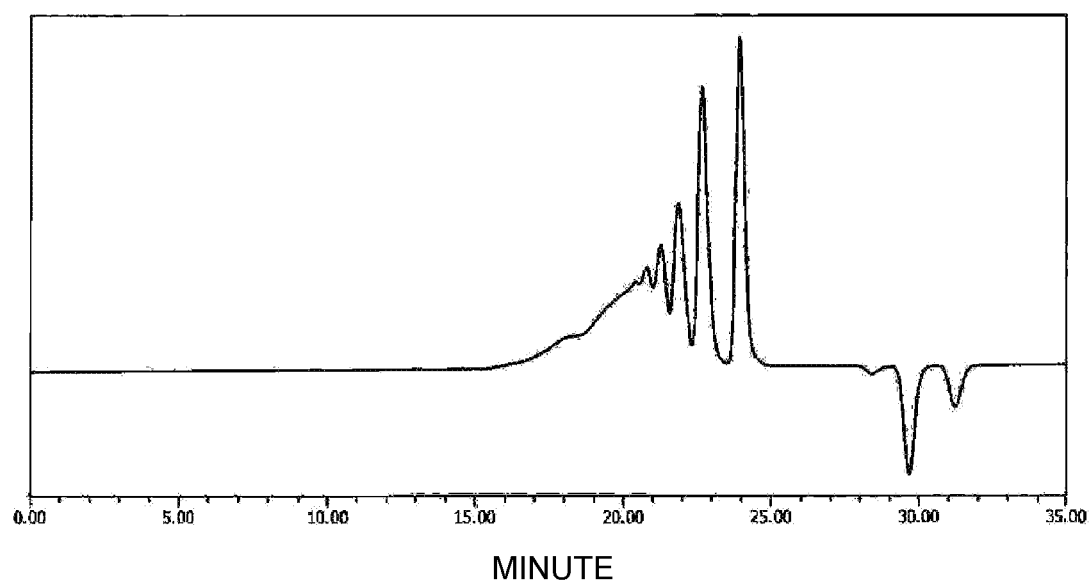
FIG. 4 shows GPC measurement results of an epoxy resin (EP-7) obtained in Synthesis Example 11.

An epoxy resin of the present invention includes a para-cresol novolac epoxy resin and is represented by General Formula (1), in which a content ratio of components represented by n=1 as measured by gel permeation chromatography is less than 10% by area and a content ratio of components represented by n=2 as measured by gel permeation chromatography is at least 1% by area and less than 40% by area

[Chem. 3]

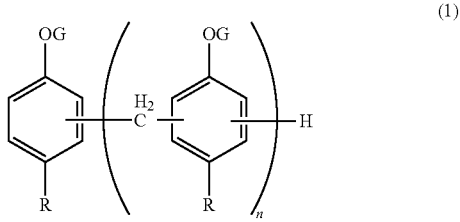

(1)

In General Formula (1), plural R's each exist independently and represent a C1-6 alkyl group. n represents a real number of 1 to 10. G represents a substituted or unsubstituted glycidyl group.

In General Formula (1), R is preferably a C1-3 alkyl group and particularly preferably a methyl group. n is preferably a real number of 1 to 6 and more preferably a real number of 2 to 4.

The substitution position of R is a para-position with respect to an OG group. For this reason, when the epoxy resin reacts with a curing agent, the epoxy resin has a structure densely filled with a network of a cured product thereof and has a high flexural modulus.

In General Formula (1), a content of components (binuclear body) represented by n=1 as measured by gel permeation chromatography (GPC) should be generally less than 10% by area. The lower limit value may be 0% by area, but is preferably greater than or equal to 1% by area, more preferably greater than or equal to 2% by area, and particularly preferably greater than or equal to 3% by area. In addition, the upper limit value is preferably less than 8% by area, more preferably less than 6% by area, and particularly preferably less than 5% by area.

In General Formula (1), the melt viscosity of the resin is excellent due to a high number of components represented by n=1, but the heat resistance of the epoxy resin-cured product is low due to a high number of bifunctional components. On the other hand, in the case where the content of components represented by n=1 is less than 10% by area, the content of polyfunctional components is relatively high. Therefore, the heat resistance of the epoxy resin-cured product is high.

In General Formula (1), a content of components (trinuclear body) represented by n=2 as measured by gel permeation chromatography (GPC) is generally greater than or equal to 1% by area and less than 40% by area. The lower limit value is preferably greater than or equal to 10% by area and more preferably greater than or equal to 20% by area. In addition, the upper limit value is preferably less than 38% by area, more preferably less than 35% by area, and particularly preferably less than 30% by area.

In General Formula (1), in a case where the content of components represented by n=2 is greater than or equal to 1% by area, the viscosity becomes moderate and the handleability improves. On the other hand, in a case where the content of components represented by n=2 is less than 40% by area, the heat resistance of the epoxy resin-cured product improves.

In General Formula (1), the total content of components (binuclear body) represented by n=1 and components (tetranuclear body) represented by n=3 as measured by gel permeation chromatography (GPC) is generally greater than or equal to 1% by area and less than 20% by area. The lower limit value is preferably greater than or equal to 5% by area and more preferably greater than or equal to 10% by area. In addition, the upper limit value is preferably less than 16% by area and more preferably less than 14% by area.

In General Formula (1), in the case where the total content of components represented by n=1 and 3 is greater than or equal to 1% by area, the content of low-molecular-weight components is large, and therefore, the melt viscosity of the resin is excellent. In addition, the components represented by n=3 are polyfunctional, and therefore, the heat resistance of the epoxy resin-cured product is high. On the other hand, in the case where the total content of components thereof is less than 20% by area, the melt viscosity is not too high, and the epoxy resin-cured product exhibits high heat resistance.

In General Formula (1), the total content of components (trinuclear body) represented by n=2 and components (pentanuclear body) represented by n=4 as measured by gel permeation chromatography (GPC) is generally greater than or equal to 10% by area and less than 50% by area. The lower limit value is preferably greater than or equal to 25% by area and more preferably greater than or equal to 30% by area. In addition, the preferred upper limit value is less than 45% by area.

In General Formula (1), in the case where the total content of components represented by n=2 and 4 is greater than or equal to 10% by area, the content of low-molecular weight components is high, and therefore, the melt viscosity of the resin is excellent. In addition, the components represented by n=4 are polyfunctional, and therefore, the heat resistance of the epoxy resin-cured product is high. On the other hand, in the case where the total content of components thereof is less than 50% by area, the melt viscosity is not too high, and the epoxy resin-cured product exhibits high heat resistance.

In the present invention, GPC analysis is performed under the following conditions.

[Various Conditions of GPC]
Manufacturer: Waters
Column: Guard Column SHODEX GPC KF-601 (2 columns), KF-602, KF-602.5 KF-603
Flow rate: 1.23 ml/min
Column temperature: 25° C.
Solvent used: Tetrahydrofuran (THF)
Detector: Differential refraction detector (RI)

The epoxy equivalent of the epoxy resin of the present invention is preferably 175 to 300 g/eq. The lower limit value thereof is more preferably greater than or equal to 190 g/eq., still more preferably greater than or equal to 206 g/eq., and most preferably greater than or equal to 210 g/eq. The upper limit value is more preferably less than or equal to 250 g/eq., particularly preferably less than or equal to 230 g/eq., and most preferably less than or equal to 220 g/eq. In the case where the epoxy equivalent is within the above-described ranges, the amount of epoxy group per unit structure becomes appropriate, which is preferable in terms of heat resistance.

The epoxy resin of the present invention has a resinous form having a softening point. The softening point is preferably 60° C. to 120° C., more preferably 65° C. to 110° C., and particularly preferably 68° C. to 100° C. A softening point of higher than or equal to 60° C. means that the molecular weight distribution is appropriate or there is no residual solvent or the like. In addition, the heat resistance becomes favorable, and problems such as poor curing, voids during molding, and the like can be curbed. In addition, in the case where the softening point is lower than or equal to 110° C., handling during kneading with other resins becomes favorable.

In addition, it is preferable that the melt viscosity be 0.10 to 4.0 Pa·s (an ICI melt viscosity (at 150° C.), a cone-and-plate method), it is more preferable that the lower limit value be greater than or equal to 0.15 Pa·s, and it is particularly preferable that the lower limit value be greater than or equal to 0.3 Pa·s. It is more preferable that the upper limit value be less than or equal to 2.0 Pa·s, and it is particularly preferable that the upper limit value be less than or equal to 1.0 Pa·s. In the case where the viscosity is greater than or equal to 0.10 Pa·s, the molecular weight distribution becomes appropriate, and the solubility in a solvent becomes favorable. In addition, in the case where the melt viscosity is less than or equal to 4.0 Pa·s, handling during kneading with other resins becomes favorable.

The epoxy resin represented by General Formula (1) is obtained through a reaction between epihalohydrins and para-cresol novolacs represented by General Formula (2).

[Chem. 4]

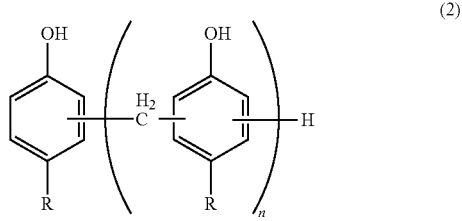

(2)

In General Formula (2), plural R's each exist independently and represent a C1-6 alkyl group. n represents a real number of 1 to 10.

In the present invention, a para-cresol novolac of a type in which generally there are an odd number of repeating units (such as a trinuclear body, a pentanuclear body, or a heptanuclear body) is preferably used as a para-cresol novolac. In general, a para-cresol novolac is synthesized through a polycondensation reaction between para-cresol and formaldehyde (or synthetic isotopes thereof). However, in ordinary novolac formation, there is a tendency for a calixarene structure to be easily formed and for it to be difficult to increase the molecular weight. In addition, even in a case where a para-cresol novolac has no calixarene structure, if a resin having a continuous molecular weight distribution including a binuclear body, a trinuclear body, a tetranuclear body, a pentanuclear body, and a hexanuclear body, problems such as a high number of epoxy equivalents (or low heat resistance due to the high number of epoxy equivalents) in a subsequent epoxidation step or high molecular weight (in some cases, gelation) are caused. Therefore, it is difficult to obtain desired heat resistance or fluidity. For this reason, a para-cresol novolac obtained through a synthesis, which is a two-step synthesis or a one-pot synthesis, through a method in which cresol is dimethylolated (or dimethoxymethylated or bishalogenomethylated (halogen: either of chlorine or bromine or both of chlorine and bromine)), and then, the dimethylolated cresol is reacted with cresol is preferably used, for example. By this synthesis method, a structure having a wide range of molecular weight distribution can be obtained, the para-cresol novolac becomes a compound in which a repeating unit of a molecule thereof is mainly an odd-numbered type (such as a trinuclear body, a pentanuclear body, or a heptanuclear body), and high heat resistance and a high elastic modulus can be achieved when epoxidized.

In General Formula (2), a content of components (binuclear body) represented by n=1 as measured by gel permeation chromatography (GPC) is generally less than 10% by area. The lower limit value may be 0% by area, but is preferably greater than or equal to 1% by area, more preferably greater than or equal to 2% by area, and particularly preferably greater than or equal to 3% by area. In addition, the upper limit value is preferably less than 8% by area and more preferably less than 6% by area.

In General Formula (2), the melt viscosity of the resin is excellent due to a high number of components represented by n=1, but the heat resistance of the epoxy resin-cured product is low due to a high number of bifunctional components. On the other hand, in the case where the content of components represented by n=1 is less than 10% by area, the content of polyfunctional components is relatively high. Therefore, the heat resistance of the epoxy resin-cured product is high.

In General Formula (2), a content of components (trinuclear body) represented by n=2 as measured by gel permeation chromatography (GPC) is generally greater than or equal to 10% by area and less than 50% by area. The lower limit value is preferably greater than or equal to 15% by area and more preferably greater than or equal to 20% by area. In addition, the preferred upper limit value is less than 40% by area.

In General Formula (2), the melt viscosity of the resin is excellent if the content of components represented by n=2 is greater than or equal to 10% by area, but the heat resistance of the epoxy resin-cured product is low if the content of components represented by n=2 is too large. On the other hand, in the case where the content of components represented by n=2 is less than 50% by area, the heat resistance is not too low while the melt viscosity is kept, and therefore, a cured product having a high heat resistance can be obtained.

In General Formula (2), the total content of components (binuclear body) represented by n=1 and components (tetranuclear body) represented by n=3 as measured by gel permeation chromatography (GPC) is generally greater than or equal to 1% by area and less than 30% by area. The lower limit value is preferably greater than or equal to 5% by area and more preferably greater than or equal to 10% by area. In addition, the upper limit value is preferably less than 25% by area and more preferably less than 20% by area.

In General Formula (2), in the case where the total content of components represented by n=1 and 3 is greater than or equal to 1% by area, the content of low-molecular-weight components is large, and therefore, the melt viscosity of the resin is excellent. In addition, the components represented by n=3 are polyfunctional, and therefore, the heat resistance of the epoxy resin-cured product is high. On the other hand, in the case where the total content of components thereof is less than 20% by area, the melt viscosity is not too high, and the epoxy resin-cured product exhibits high heat resistance.

In General Formula (2), the total content of components (trinuclear body) represented by n=2 and components (pentanuclear body) represented by n=4 as measured by gel permeation chromatography (GPC) is generally greater than or equal to 20% by area and less than 65% by area. The lower limit value is preferably greater than or equal to 25% by area and more preferably greater than or equal to 30% by area. In addition, the preferred upper limit value is less than 60% by area.

In General Formula (2), in the case where the total content of components represented by n=2 and 4 is greater than or equal to 20% by area, the content of low-molecular-weight components is large, and therefore, the melt viscosity of the resin is excellent. In addition, the components represented by n=4 are polyfunctional, and therefore, the heat resistance of the epoxy resin-cured product is high. On the other hand, in the case where the total content of components thereof is less than 65%, the melt viscosity is not too high, and the epoxy resin-cured product exhibits high heat resistance.

The epoxy resin composition of the present invention contains a curing agent. Examples of curing agents that can be used include an amine-based curing agent, an acid anhydride-based curing agent, an amide-based curing agent, and a phenolic curing agent.

3,3'-Diaminodiphenyl sulfone (3,3'-DDS), 4,4'-diaminodiphenyl sulfone (4,4'-DDS), diaminodiphenylmethane (DDM), 3,3'-diisopropyl-4,4'-diaminodiphenylmethane, 3,3'-di-t-butyl-4,4'-diaminodiphenylmethane, 3,3'-diethyl-5,5'-dimethyl-4,4'-diaminodiphenylmethane, 3,3'-diisopropyl-5,5'-dimethyl-4,4'-diaminodiphenylmethane, 3,3'-di-t-butyl-5,5'-dimethyl-4,4'-diaminodiphenylmethane, 3,3',5,5'-tetraethyl-4,4'-diaminodiphenylmethane, 3,3'-diisopropyl-5,5'-diethyl-4,4'-diaminodiphenylmethane, 3,3'-di-t-butyl-5,5'-diethyl-4,4'-diaminodiphenylmethane, 3,3',5,5'-tetraisopropyl-4,4'-diaminodiphenylmethane, 3,3'-di-t-butyl-5,5'-diisopropyl-4,4'-diaminodiphenylmethane, 3,3',5,5'-tetra-t-butyl-4,4,4'-diaminodiphenylmethane, diaminodiphenyl ether (DADPE), bisaniline, benzyldimethylaniline, 2-(dimethylaminomethyl)phenol (DMP-10), 2,4,6-tris(dimethylaminomethyl)phenol (DMP-30), and 2-ethylhexanoate of 2,4,6-tris (dimethylaminomethyl) phenol can be used as amine-based curing agents. In addition, examples thereof include: aniline resins obtained through a reaction of xylylene chloride with an aniline novolac, an orthoethylaniline novolac, and aniline; and aniline resins obtained through polycondensation of aniline with substituted biphenyls (such as 4,4'-bis(chloromethyl)-1,1'-biphenyl and 4,4'-bis(methoxymethyl)-1,1'-biphenyl), substituted phenyls (such as 1,4-bis(chloromethyl)benzene, 1,4-bis(methoxymethyl)benzene, and 1,4-bis(hydroxymethyl)benzene), or the like.

Examples of acid anhydride-based curing agents include phthalic anhydride, trimellitic anhydride, pyromellitic anhydride, maleic anhydride, tetrahydrophthalic anhydride, methyltetrahydrophthalic anhydride, methyl nadic anhydride, hexahydrophthalic anhydride, and methylhexahydrophthalic anhydride.

Examples of amide-based curing agents include dicyandiamide or a polyamide resin synthesized from ethylenediamine and a dimer of linolenic acid.

Examples of phenolic curing agents include polyphenols (such as bisphenol A, bisphenol F, bisphenol S, fluorene bisphenol, terpene diphenol, 4,4'-dihydroxybiphenyl, 2,2'-dihydroxybiphenyl, 3,3',5,5'-tetramethyl-(1,1'-biphenyl)-4,4'-diol, hydroquinone, resorcin, naphthalenediol, tris-(4-hydroxyphenyl)methane, and 1,1,2,2-tetrakis(4-hydroxyphenyl)ethane); phenolic resins obtained through condensation of phenols (for example, phenol, alkyl-substituted phenol, naphthol, alkyl-substituted naphthol, dihydroxybenzene, and dihydroxynaphthalene) with aldehydes (such as formaldehyde, acetaldehyde, benzaldehyde, p-hydroxybenzaldehyde, o-hydroxybenzaldehyde, and furfural), ketones (such as p-hydroxyacetophenone and o-hydroxyacetophenone), or dienes (such as dicyclopentadiene and tricyclopentadiene); phenolic resins obtained through condensation of the phenols with substituted phenyls (such as 4,4'-bis(chloromethyl)-1,1'-biphenyl and 4,4'-bis(methoxymethyl)-1,1'-biphenyl) or substituted phenyls (such as 1,4-bis(chloromethyl)benzene, 1,4-bis(methoxymethyl)benzene, and 1,4-bis(hydroxymethyl)benzene); modified products of phenols and/or phenolic resins; and halogenated phenols of tetrabromobisphenol A, brominated phenolic resins, and the like. Among these, phenolic resins obtained through condensation of phenols with aldehydes or phenolic resins obtained through condensation of phenols with substituted biphenyls are preferable, and phenolic resins obtained through condensation of phenols with formaldehyde or phenolic resins obtained through condensation of phenols with 4,4'-bis(chloromethyl)-1,1'-biphenyl are more preferable.

The amount of curing agent used in the epoxy resin composition of the present invention is preferably 0.7 to 1.2 equivalents relative to 1 equivalent of epoxy groups of epoxy resins. In either case where the amount thereof is less than 0.7 equivalents or greater than 1.2 equivalents relative to 1 equivalent of epoxy groups, there is a concern that curing may be incomplete and favorable cured product properties may not be obtained.

In addition, a curing promoter may be formulated with the epoxy resin composition of the present invention as necessary. The gelation time can be adjusted by using a curing promoter. Examples of curing promoters that can be used include imidazoles such as 2-methylimidazole, 2-ethylimidazole, 2-ethyl-4-methylimidazole, tertiary amines such as 2-(dimethylaminomethyl)phenol and 1,8-diaza-bicyclo(5,4,0)undecene-7, phosphines such as triphenylphosphine, carboxylic acids such as salicylic acid, and metal compounds such as tin octylate. A curing promoter may be used in an amount of 0.01 to 5.0 parts by weight based on 100 parts by weight of an epoxy resin as necessary.

In the epoxy resin composition of the present invention, a combination of two or more kinds of epoxy resins may be used by formulation with other epoxy resins in addition to the epoxy resin represented by General Formula (1). Specific examples thereof include polycondensates of phenols (such as phenol, alkyl-substituted phenol, aromatic-substituted phenol, naphthol, alkyl-substituted naphthol, dihydroxybenzene, alkyl-substituted dihydroxybenzene, and dihydroxynaphthalene) with various aldehydes (such as formaldehyde, acetaldehyde, alkylaldehyde, benzaldehyde, alkyl-substituted benzaldehyde, hydroxybenzaldehyde, naphthaldehyde, glutaraldehyde, phthalaldehyde, crotonaldehyde, and cinnamaldehyde); polymers of phenols and various diene compounds (such as dicyclopentadiene, terpenes, vinylcyclohexene, norbornadiene, vinylnorbornene, tetrahydroindene, divinylbenzene, divinylbiphenyl, diisopropenylbiphenyl, butadiene, and isoprene); polycondensates of phenols and ketones (such as acetone, methyl ethyl ketone, methyl isobutyl ketone, acetophenone, and benzophenone); phenolic resins obtained through polycondensation of phenols with substituted biphenyls (such as 4,4'-bis(chloromethyl)-1,1'-biphenyl and 4,4'-bis(methoxymethyl)-1,1'-biphenyl) or substituted phenyls (such as 1,4-bis(chloromethyl)benzene, 1,4-bis(methoxymethyl)benzene, and 1,4-bis(hydroxymethyl)benzene); polycondensates of bisphenols and various aldehydes; glycidyl ether epoxy resins obtained by glycidylating alcohols; alicyclic epoxy resins represented by 4-vinyl-1-cyclohexene diepoxide, 3,4-epoxycyclohexylmethyl-3,4'-epoxycyclohexanecarboxylate, or the like; glycidyl amine epoxy resins represented by tetraglycidyl diaminodiphenylmethane (TGDDM), triglycidyl-p-aminophenol, or the like; and glycidyl ester epoxy resins. However, the present invention is not limited thereto as long as these are epoxy resins generally used.

In the case where a combination of the epoxy resin represented by General Formula (1) and other epoxy resins is used, the proportion of the epoxy resin represented by General Formula (1) in the total amount of epoxy resins is preferably greater than or equal to 30 weight % and particularly preferably greater than or equal to 40 weight %. In the case where the proportion of the epoxy resin represented by General Formula (1) is greater than or equal to 30 weight %, properties such as heat resistance, elastic modulus, and water resistance improve.

Well-known additives can also be mixed into the epoxy resin composition of the present invention as necessary. Specific examples of additives that can be used include polybutadiene and modified products thereof, modified products of an acrylonitrile copolymer, polyphenylene ether, polystyrene, polyethylene, polyimide, fluororesins, maleimide compounds, cyanate ester compounds, silicone gel, silicone oil, inorganic fillers such as silica, alumina, calcium carbonate, quartz powder, aluminum powder, graphite, talc, clay, iron oxide, titanium oxide, aluminum nitride, asbestos, mica, and glass powder, surface treatment agents, such as a silane coupling agent, for fillers, releasing agents, and coloring agents such as carbon black, phthalocyanine blue, and phthalocyanine green.

Well-known maleimide compounds can also be mixed into the epoxy resin composition of the present invention as necessary. Specific examples of maleimide compounds that can be used include 4,4'-diphenylmethane bismaleimide, polyphenylmethane maleimide, m-phenylene bismaleimide, 2,2'-bis[4-(4-maleimidophenoxy)phenyl]propane, 3,3'-dimethyl-5,5'-diethyl-4,4'-diphenylmethane bismaleimide, 4-methyl-1,3-phenylene bismaleimide, 4,4'-diphenyl ether bismaleimide, 4,4'-diphenyl sulfone bismaleimide, 1,3-bis(3-maleimidophenoxy)benzene, and 1,3-bis(4-maleimidophenoxy)benzene, but the present invention is not limited thereto. These may be used alone or in combination of two or more thereof. When the maleimide compound is incorporated, a curing promoter is incorporated if necessary, but a curing promoter, an organic peroxide or a radical polymerization initiator such as an azo compound can be used.

An organic solvent can be added to the epoxy resin composition of the present invention to produce a varnish-like composition (hereinafter, simply referred to as varnish). Examples of solvents that can be used include: γ-butyrolactones; amide-based solvents such as N-methylpyrrolidone, N,N-dimethylformamide, N,N-dimethylacetamide, and N,N-dimethylimidazolidinone; sulfones such as tetramethylene sulfone; ether-based solvents such as diethylene glycol dimethyl ether, diethylene glycol diethyl ether, propylene glycol, propylene glycol monomethyl ether, propylene glycol monomethyl ether monoacetate, and propylene glycol monobutyl ether; ketone-based solvents such as methyl ethyl ketone, methyl isobutyl ketone, cyclopentanone, and cyclohexanone; and aromatic solvents such as toluene and xylene. A solvent is used in such a range that the solid content concentration excluding the solvent in the obtained varnish is generally 10 to 80 weight %, preferably 20 to 70 weight %.

Next, a resin sheet, a prepreg, and a carbon fiber-reinforced composite material of the present invention will be described.

A single surface or both surfaces of a support substrate can be coated with the epoxy resin composition of the present invention which can be used as a resin sheet. Examples of coating methods include a casting method, a method of extruding a resin from a nozzle or a die with a pump, an extruder, or the like, a method of adjusting a thickness with a blade, a method of adjusting a thickness through calendering with a roll, and a spraying method with a spray or the like. In the step of forming a layer, the formation of a layer may be performed while heating the epoxy resin composition within a temperature range in which thermal decomposition of the epoxy resin composition can be avoided. In addition, rolling processing, grinding processing, and the like may be performed as necessary. Examples of support substrates include: porous substrates made of paper, cloth, non-woven fabric, or the like; plastic films such as polyethylene film, polypropylene film, polyethylene terephthalate film, and a polyester film; sheets; nets; foamed bodies; metal foils; and appropriate thin leaf-like bodies such as laminate bodies thereof, but the present invention is not limited thereto. The thickness of a support substrate is not particularly limited, and can be appropriately determined according to the application.

The prepreg of the present invention can be obtained by heating and melting the epoxy resin composition and/or the resin sheet of the present invention to reduce the viscosity thereof and impregnating the epoxy resin composition and/or the resin sheet of the present invention into a fiber substrate.

In addition, the prepreg of the present invention can also be obtained by impregnating a varnish-like epoxy resin composition into a fiber substrate and performing heating and drying.

A carbon fiber-reinforced composite material of the present invention can be obtained by cutting the above-described prepreg into desired shapes, laminating the cut prepreg sheets, and then, heat-curing an epoxy resin composition while applying pressure to the laminated product through a press molding method, an autoclave molding method, a sheet-winding molding method, or the like. In addition, copper foils or organic films can also be laminated during the lamination of the prepreg sheets.

In addition, the carbon fiber-reinforced composite material of the present invention can also be obtained through molding through well-known methods in addition to the above-described methods. For example, a resin transfer molding technique (RTM method) in which a carbon fiber substrate (in general, carbon fiber woven fabric is used) is cut, laminated, and shaped to prepare a preform (preliminary molded body before impregnation of a resin), the preform is placed in a molding die which is then closed, a resin is injected thereinto to be impregnated into the preform and is cured, and then, the die is opened to take out the molded product can be used.

In addition, a VaRTM method, a Seeman's composite resin infusion molding process (SCRIMP) method, and a controlled atmospheric pressure resin infusion (CAPRI) method for more appropriately controlling a resin infusion process, particularly the VaRTM method, by evacuating a resin supply tank disclosed in Published Japanese Translation No. 2005-527410 to a pressure lower than atmospheric pressure, using circulation compression, and controlling the net molding pressure, which are kinds of RTM methods can be used, for example.

Furthermore, in the carbon fiber-reinforced composite material of the present invention, a film stacking method in which a fiber substrate is sandwiched between resin sheets (films), a method for making a powdery resin adhere to a reinforced fiber substrate for improving impregnation, a molding method (powder-impregnated yarn) in which a fluidized bed or a fluid slurry method is used in the process of mixing a resin with a fiber substrate, and a method for mixing resin fibers with a fiber substrate can also be used.

Examples of carbon fibers include acrylic carbon fibers, pitch-based carbon fibers, and rayon-based carbon fibers, and among these, acrylic carbon fibers having a high tensile strength are preferably used. As the forms of carbon fibers, twisted yarn, untwisted yarn, non-twisted yarn, and the like can be used. Untwisted yarn or non-twisted yarn is preferably used because of a favorable balance between moldability and strength characteristics of a carbon fiber-reinforced composite material.

EXAMPLES

Hereinafter, the present invention will be described more specifically with reference to synthesis examples and examples. Materials, processing contents, processing procedures, and the like shown below can be appropriately changed without departing from the gist of the present invention. Accordingly, the scope of the present invention should not be limitedly interpreted by specific examples shown below.

Various analysis methods used in the examples were performed under the following conditions.

Epoxy Equivalent

It is measured through a method described in JIS K-7236, and the unit is g/eq.

Softening Point

It is measured through a method according to JIS K-7234, and the unit is ° C.

Melt Viscosity

It is a ICI melt viscosity (at 150° C.) measured through a cone-plate method, and the unit is Pa·s.

Gel Permeation Chromatography (GPC) Analysis

Manufacturer: Waters

Column: Guard Column SHODEX GPC KF-601 (2 columns), KF-602, KF-602.5 KF-603

Flow rate: 1.23 ml/min

Column temperature: 25° C.

Solvent used: Tetrahydrofuran (THF)

Detector: Differential refraction detector (RI)

Synthesis Example 1

216 Parts (2 mol) of para-cresol was added to a four-neck flask equipped with a thermometer and a stirrer, and 400 parts (2 mol as caustic soda) of a 20% aqueous sodium hydroxide solution was added dropwise thereto to obtain sodium salts of para-cresol.

Next, 120 parts (4 mol) of paraformaldehyde was gradually added thereto while keeping the reaction temperature at 5° C. or lower in an ice bath. The mixture was reacted for 1 hour while keeping the reaction temperature at 5° C. or lower, and was then further reacted for 1 hour while increasing the temperature to 20° C.

The obtained reaction solution was cooled, concentrated hydrochloric acid was added dropwise thereto while keeping the temperature at 30° C., and it was confirmed that the mixture became neutral to pH test paper. This reaction solution was filtered, washed with water, and then dried to obtain 300 parts (yield of 89%) of a dimethylol body (DM-1) which was a target product.

Synthesis Example 2

378 Parts (3.5 mol) of para-cresol and 2 parts (0.012 mol) of para-toluenesulfonic acid were added to a four-neck flask equipped with a thermometer and a stirrer, and the temperature of the reaction solution was kept at 45° C. in a water bath. Next, 168 parts (1 mol) of DM-1 obtained in Synthesis Example 1 was gradually added thereto while keeping the reaction temperature at 45° C. in a water bath. The mixture was reacted for 5 hours while keeping the reaction temperature at 45° C., and was then further reacted for 1 hour while increasing the temperature to 80° C. 4 Parts (0.01 mol) of sodium tripolyphosphate was added to the obtained reaction solution, and the mixture was stirred for several minutes and washed with water. Then, it was confirmed that the system of the mixture became neutral to pH test paper. This solution was distilled under reduced pressure with a rotary evaporator to recover unreacted para-cresol, and 300 g of a para-cresol novolac (PCN-1) was obtained. GPC measurement results are shown in Table 1.

Synthesis Example 3

305 g of a para-cresol novolac (PCN-2) was obtained through synthesis in the same method as in Synthesis Example 2 except that para-cresol was incorporated in an amount of 2.8 mol. GPC measurement results are shown in Table 1.

Synthesis Example 4

308 g of a para-cresol novolac (PCN-3) was obtained through synthesis in the same method as in Synthesis Example 2 except that para-cresol was incorporated in an amount of 2.5 mol. GPC measurement results are shown in Table 1.

Synthesis Example 5

310 g of a para-cresol novolac (PCN-4) was obtained through synthesis in the same method as in Synthesis Example 2 except that para-cresol was incorporated in an amount of 2.1 mol. GPC measurement results are shown in Table 1.

Synthesis Example 6

310 g of a para-cresol novolac (PCN-5) was obtained through synthesis in the same method as in Synthesis Example 2 except that para-cresol was incorporated in an amount of 4.3 mol. GPC measurement results are shown in Table 1.

Synthesis Example 7

864 Parts (8.0 mol) of para-cresol and 2 parts (0.012 mol) of para-toluenesulfonic acid were added to a four-neck flask equipped with a thermometer and a stirrer, and the temperature of the reaction solution was kept at 45° C. in a water bath. Next, 168 parts (1 mol) of DM-1 obtained in Synthesis Example 1 was gradually added thereto while keeping the reaction temperature at 45° C. in a water bath. The mixture was reacted for 5 hours while keeping the reaction temperature at 45° C., and was then further reacted for 1 hour while increasing the temperature to 80° C. 4 Parts (0.01 mol) of sodium tripolyphosphate was added to the obtained reaction solution, and the mixture was stirred for several minutes and washed with water. Then, it was confirmed that the system of the mixture became neutral to pH test paper. This solution was distilled under reduced pressure with a rotary evaporator to recover unreacted para-cresol. Next, a step of recrystallizing this para-cresol resin with toluene was repeated, the resultant was filtered and dried under reduced pressure to obtain 250 g of PCN-6 which was a target product. GPC measurement results are shown in Table 1.

Synthesis Example 8

648 Parts (6 mol) of para-cresol, 684 parts of toluene as a solvent, and 3 parts (0.02 mol) of para-toluenesulfonic acid monohydrate were added to a four-neck flask equipped with a thermometer, a stirrer, and a Dean-Stark trap, and the internal temperature was raised to 80° C. Next, 129 parts (1.5 mol) of a 35% aqueous formalin solution was gradually added thereto. Thereafter, the reaction temperature was raised from 80° C. to 120° C. while dehydrating, and the mixture was reacted for 5 hours at 120° C.

The obtained reaction solution was cooled to 80° C., para-toluenesulfonic acid, which was a catalyst, was deactivated with 15 parts (0.04 mol) of sodium tripolyphosphate, this reaction solution was washed with water, and excess para-cresol and the solvent, which was toluene, were distilled off through evaporation to obtain 285 g of a target para-cresol novolac (PCN-7). GPC measurement results are shown in Table 1.

Example 1

248 Parts of a para-cresol novolac (PCN-1), 777 parts (8.4 mol) of epichlorohydrin, and 389 parts (5.0 mol) of dimethyl sulfoxide were added to a four-neck flask equipped with a thermometer and a stirrer, and the temperature was raised to 55° C. in a water bath. 90 Parts (2.3 mol) of flaky sodium hydroxide was dividedly added thereto over 90 minutes when the internal temperature reached 55° C. and the mixture was reacted for 2 hours at 55° C. and further reacted for 1 hour at 70° C. The reaction solution was transferred to a separatory funnel, warm water was added thereto to wash the reaction solution with water, and the obtained solution was distillation under reduced pressure with a rotary evaporator to recover unreacted epichlorohydrin. The residue was dissolved in 731 parts (7.3 mol) of methyl isobutyl ketone, the temperature of the solution was raised to 70° C., and 18 parts of a 30 weight % aqueous sodium hydroxide solution (0.1 mol as sodium hydroxide) was added thereto to cause a reaction for 1 hour. Thereafter, the reaction solution was washed with water until a washing liquid became neutral. Methyl isobutyl ketone and the like were distilled off from the obtained solution under reduced pressure at 180° C. with a rotary evaporator to obtain 347 g of an epoxy resin (EP-1) of the present invention. The ICI viscosity (at 150° C.) of the obtained resin was 0.16 Pa·s, and the epoxy equivalent thereof was 208 g/eq. GPC measurement results are shown in Table 1.

Example 2

345 g of an epoxy resin (EP-2) was obtained through synthesis in the same method as in Example 1 except that PCN-2 was used as a phenolic resin which is a raw material. The ICI viscosity (at 150° C.) of the obtained resin was 0.39 Pa·s, and the epoxy equivalent thereof was 213 g/eq. GPC measurement results are shown in Table 1.

Example 3

335 g of an epoxy resin (EP-3) was obtained through synthesis in the same method as in Example 1 except that PCN-3 was used as a phenolic resin which is a raw material. The ICI viscosity (at 150° C.) of the obtained resin was 0.86 Pa·s, and the epoxy equivalent thereof was 216 g/eq. GPC measurement results are shown in Table 1.

Example 4

325 g of an epoxy resin (EP-4) was obtained through synthesis in the same method as in Example 1 except that PCN-4 was used as a phenolic resin which is a raw material. The ICI viscosity (at 150° C.) of the obtained resin was 3.24 Pa·s, and the epoxy equivalent thereof was 226 g/eq. GPC measurement results are shown in Table 1.

Synthesis Example 9

320 g of an epoxy resin (EP-5) was obtained through synthesis in the same method as in Example 1 except that PCN-5 was used as a phenolic resin which is a raw material. The ICI viscosity (at 150° C.) of the obtained resin was 0.13 Pa·s, and the epoxy equivalent thereof was 205 g/eq. GPC measurement results are shown in Table 1.

Synthesis Example 10

321 g of an epoxy resin (EP-6) was obtained through synthesis in the same method as in Example 1 except that PCN-6 was used as a phenolic resin which is a raw material. The ICI viscosity (at 150° C.) of the obtained resin was 0.05 Pa·s, and the epoxy equivalent thereof was 202 g/eq. GPC measurement results are shown in Table 1.

Synthesis Example 11

342 g of an epoxy resin (EP-7) was obtained through synthesis in the same method as in Example 1 except that PCN-7 was used as a phenolic resin which is a raw material. The ICI viscosity (at 150° C.) of the obtained resin was 0.08 Pa·s, and the epoxy equivalent thereof was 218 g/eq. GPC measurement results are shown in Table 1.

TABLE 1

|  | $n = 1$ | $n = 2$ | $n = 3$ | $n = 4$ | $n = 5$ | $n = 6$ or greater |
|---|---|---|---|---|---|---|
| PCN-1 | 4.7 | 46.0 | 9.7 | 17.5 | 6.7 | 15.5 |
| PCN-2 | 5.2 | 35.6 | 13.0 | 19.3 | 9.3 | 17.4 |
| PCN-3 | 3.4 | 27.1 | 10.4 | 17.6 | 7.4 | 34.2 |
| PCN-4 | 2.8 | 19.5 | 8.5 | 14.9 | 9.0 | 45.3 |
| PCN-5 | 3.4 | 54.2 | 8.4 | 15.3 | 6.3 | 12.3 |
| PCN-6 | 0.9 | 94.5 | 1.5 | 2.5 | 0.6 | 0 |
| PCN-7 | 25.0 | 25.2 | 16.7 | 11.4 | 8.1 | 13.6 |
| EP-1 | 4.0 | 37.4 | 8.4 | 12.3 | 8.7 | 29.2 |
| EP-2 | 4.0 | 27.0 | 9.1 | 13.1 | 8.0 | 38.8 |
| EP-3 | 2.9 | 21.6 | 8.2 | 12.2 | 8.8 | 46.3 |
| EP-4 | 2.2 | 15.7 | 6.7 | 11.3 | 6.5 | 57.8 |
| EP-5 | 2.7 | 43.8 | 6.9 | 11.5 | 8.9 | 26.1 |
| EP-6 | 0 | 60.9 | 2.1 | 20.5 | 9.1 | 7.8 |
| EP-7 | 20.7 | 20.0 | 13.1 | 9.8 | 6.8 | 29.7 |

Examples to and Comparative Examples 1 to 5

The epoxy resins (EP-1 to 4) obtained in Examples 1 to 4 and the epoxy resins (EP-5 to 7) obtained in Synthesis Examples 9 to 11, which were respectively used as main agents, a phenol novolac (at a softening point of 83° C. and a hydroxyl equivalent of 106 g/eq.) which was used as a curing agent, and triphenylphosphine (TPP) which was used as a curing promoter were mixed with each other at weight ratios shown in the formulation compositions of Table 2, and were cured under the curing conditions of 160° C. for 2 hours and 180° C. for 6 hours. In addition, an ortho-cresol novolac epoxy resin EOCN-1020 (manufactured by Nippon Kayaku Co., Ltd., softening point of 55° C. ICI viscosity (at 150° C.) of 0.05 Pa·s, and epoxy equivalent of 194 g/eq.) as an epoxy main agent for Comparative Example 4 and a trisphenolmethane epoxy resin EPPN-502H (manufactured by Nippon Kayaku Co., Ltd., softening point of 67° C., ICI viscosity (at 150° C.) of 0.02 Pa·s, and epoxy equivalent of 170 g/eq.) as an epoxy main agent for Comparative Example 5 were used to produce cured products with the formulation compositions of Table 2. Results obtained by measuring the physical properties of the obtained cured products are shown in Table 2.

The physical property values were measured under conditions as follows.

Heat Resistance (Tg)
Dynamic viscoelasticity measuring device: TA-instruments, DMA-2980
Measurement temperature range: −30° C. to 280° C.
Temperature increase/decrease rate: 2° C./minute
Tg: The peak point of Tan δ was regarded as Tg.
Flexural Modulus
It was measured according to JIS K-7074.
Water Absorption Rate
The weights of a disk-like test piece having a diameter of 5 cm and a thickness of 4 mm before and after boiling the disk-like test piece in water at 100° C. for 72 hours were measured, and the increase rate (%) thereof was regarded as a water absorption rate.

epoxy resin was used had a high heat resistance, but had a low flexural modulus and a high water absorption rate.

Examples 9 to 12 and Comparative Examples 6 and 7

The epoxy resins (EP-1 to 4) obtained in Examples 1 to 4 which were respectively used as main agents, 3,3',5,5'-tetraethyl-4,4'-diaminodiphenylmethane (abbreviation; TEDDM, manufactured by Tokyo Chemical Industry Co., Ltd., active hydrogen equivalent of 78 g/eq.) which was used as a curing agent, and salicylic acid (manufactured by Junsei Chemical Co., Ltd., special grade) which was used as a curing promoter were mixed with each other at weight ratios

TABLE 2

| Formulation composition table | | Trinuclear body (n = 2) proportion | Example 5 | Example 6 | Example 7 | Example 8 | Comparative Example 1 | Comparative Example 2 | Comparative Example 3 | Comparative Example 4 | Comparative Example 5 |
|---|---|---|---|---|---|---|---|---|---|---|---|
| Epoxy resin | EP-1 | 37.4 | 316 | | | | | | | | |
| | EP-2 | 27.0 | | 272 | | | | | | | |
| | EP-3 | 21.6 | | | 133 | | | | | | |
| | EP-4 | 15.7 | | | | 111 | | | | | |
| | EP-5 | 43.8 | | | | | 100 | | | | |
| | EP-6 | 60.9 | | | | | | 61 | | | |
| | EP-7 | 20.0 | | | | | | | 100 | | |
| | EOCN-1020 | | | | | | | | | 275 | |
| | EPPN-502H | | | | | | | | | | 170 |
| Curing agent | Phenol novolac | | 163 | 135 | 66 | 53 | 48 | 30 | 47 | 151 | 105 |
| Curing promoter | TPP | | 3 | 3 | 1 | 1 | 1 | 1 | 1 | 3 | 2 |
| Cured product properties | Flexural modulus [GPa] | | 3.7 | 3.5 | 3.5 | 3.5 | 3.5 | 3.4 | 3.5 | 3.2 | 3.0 |
| | Tg [° C.] | | 191 | 198 | 204 | 214 | 178 | 166 | 174 | 185 | 244 |
| | Absorption rate [%] | | 1.2 | 1.2 | 1.2 | 1.3 | 1.2 | 1.2 | 1.2 | 1.3 | 2.2 |

It was confirmed from the results of Table 2 that Examples 5 to 8 obtained through curing of phenol novolacs had a high heat resistance (Tg) exceeding 180° C. required for CFRP applications, and excellent flexural modulus and low water absorptivity.

On the other hand, Comparative Examples 1 and 2 which have a high component proportion of a trinuclear body (n=2) have a low heat resistance. In Comparative Example 3 (EP-7), the component proportion of a trinuclear body (n=2) is 20.0%, but the component proportion of a binuclear body (n=1) is 20.7%. Therefore, there were many low molecular components, and the cured product had low heat resistance.

In addition, it was confirmed that Comparative Example 4 in which an ortho-cresol novolac epoxy resin was used had lower elastic modulus and heat resistance than a para-cresol novolac epoxy resin. In addition, it was confirmed that Comparative Example 5 in which a trisphenolmethane epoxy resin was used had a high heat resistance, but had a low flexural modulus and a high water absorption rate.

shown in the formulation compositions of Table 3, and were cured under the curing conditions of 160° C. for 6 hours.

A dicyclopentadiene epoxy resin XD-1000 (manufactured by Nippon Kayaku Co., Ltd., softening point of 74° C., ICI viscosity (at 150° C.) of 0.20 Pa·s, and epoxy equivalent of 250 g/eq.) which was used as an epoxy main agent in Comparative Example 6 and a biphenyl aralkyl epoxy resin NC-3000 (manufactured by Nippon Kayaku Co., Ltd., softening point of 57° C., ICI viscosity (at 150° C.) of 0.09 Pa·s, and epoxy equivalent of 275 g/eq.) which was used as an epoxy main agent in Comparative Example 7 each were incorporated at weight ratios shown in the formulation compositions of Table 3, and were cured under the curing conditions of 160° C. for 6 hours. Results obtained by measuring the physical properties of the obtained cured products are shown in Table 3.

TABLE 3

| Formulation composition table | | Trinuclear body (n = 2) proportion | Example 9 | Example 10 | Example 11 | Example 12 | Comparative Example 6 | Comparative Example 7 |
|---|---|---|---|---|---|---|---|---|
| Epoxy resin | EP-1 | 37.4 | 100 | | | | | |
| | EP-2 | 27.0 | | 100 | | | | |
| | EP-3 | 21.6 | | | 100 | | | |
| | EP-4 | 15.7 | | | | 100 | | |
| | XD-1000 | | | | | | 100 | |
| | NC-3000 | | | | | | | 100 |
| Curing agent | TEDDM | | 38 | 37 | 36 | 35 | 31 | 28 |

TABLE 3-continued

| Formulation composition table | | Trinuclear body (n = 2) proportion | Example 9 | Example 10 | Example 11 | Example 12 | Comparative Example 6 | Comparative Example 7 |
|---|---|---|---|---|---|---|---|---|
| Curing promoter | Salicylic acid | | 2 | 2 | 2 | 2 | 2 | 2 |
| Cured product properties | Flexural modulus [GPa] | | 3.1 | 3.1 | 3.2 | 3.2 | 2.5 | 2.2 |
| | Tg [° C.] | | 195 | 205 | 211 | 218 | 208 | 171 |
| | Absorption rate [%] | | 1.3 | 1.3 | 1.3 | 1.3 | 1.0 | 1.0 |

It was confirmed from the results of Table 3 that Examples 9 to 12 obtained by amine curing had a high heat resistance, a high flexural modulus, and excellent low water absorptivity.

On the other hand, it was confirmed that Comparative Example 6 in which a dicyclopentadiene skeleton epoxy resin was used had a low flexural modulus and Comparative Example 7 in which biphenyl aralkyl skeleton epoxy resin was used as a main agent had low heat resistance and flexural modulus.

Example 13 and Comparative Example 8

The formulations shown in proportions of Table 4 were homogeneously mixed with each other with a mixing roll to obtain epoxy resin compositions. These compositions were pulverized to obtain tablets using a tablet machine. The obtained tablets were molded with a transfer molding machine to mold 10×4×90 mm test pieces. These test pieces were heated at 160° C. for 2 hours and further at 180° C. for 8 hours to perform post-curing. These test pieces were perpendicularly held in clamps, flame of a burner was adjusted to blue flame of 19 mm, and 9.5 mm of the flame was applied to lower end central portions of the test pieces for 10 seconds. The burner was removed after the application of the flame, and the combustion duration was measured. The flame was applied thereto for 10 seconds immediately after extinguishing the flame, and then, the burner was removed to measure the combustion duration. The total value of the combustion time for 10 times of each of the samples is shown in Table 4.

TABLE 4

| Formulation composition table | | Example 13 | Comparative Example 8 |
|---|---|---|---|
| Epoxy resin | EP-1 | 15.0 | |
| | EOCN-1020 | | 15.0 |
| Curing agent | MEHC-7800SS | 12.3 | 13.1 |
| Curing promoter | TPP | 0.2 | 0.3 |
| Filler | Silica | 134 | 139 |
| Flame-retardant test | Combustion time (second) | 40 | 166 |
| | Determination | V-0 | V-2 |

MEHC-7800SS: Biphenyl aralkyl phenolic resin (manufactured by Meiwa Plastic Industries, Ltd.)

Filler: Molten silica (manufactured by Tatsumori Ltd., MSR-2212)

It was confirmed from the results of Table 4 that Example 13 had a short combustion time and excellent flame retardancy. On the other hand, it was confirmed that Comparative Example 8 in which an ortho-cresol novolac epoxy resin was used has a long combustion time and inferior flame retardancy.

Example 14

10 Parts of the epoxy resin (EP-1) obtained in Example 1 and 1 active hydrogen equivalent of 3,3',5,5'-tetraethyl-4,4'-diaminodiphenylmethane (abbreviation: TEDDM, manufactured by Tokyo Chemical Industry Co., Ltd., active hydrogen equivalent of 78 g/eq.) based on the epoxy resin, which was a curing agent, were added to a flask, and were heated and mixed with each other at 120° C. for 30 minutes until the mixture becomes homogeneous. After mixing, two sheets of cushion paper (manufactured by Tokyo Tokushu Shigyo Go., Ltd., KS-190) which were previously cut into a size of 10 cm×10 cm square were stacked on a copper foil, and four sheets of carbon cloth having a thickness of 150 μm and a cotton density of 18 threads/inch were stacked thereon, and the melted resin was cast thereon. Subsequently, a copper foil was stacked on the upper surface thereof, a load of 10 MPa was applied thereto at 180° C. for 80 minutes through hot-plate pressing to perform pre-curing, and then, post-curing was performed at 180° C. for 6 hours to obtain a carbon fiber-reinforced composite material (CFRP). A 4 mm×16 mm square evaluation sample was cut out from the obtained CFRP, and the heat resistance was measured through the following method. The measurement results are shown in Table 5.

Elastic Modulus, Heat Resistance (Tg)
Dynamic viscoelasticity measuring device: TA-instruments, DMA-2980
    Measurement temperature range: −30° C. to 280° C.
    Temperature increase/decrease rate: 2° C./minute
    Elastic modulus: Storage elastic modulus at 50° C.
    Tg: The peak point of Tan δ was regarded as Tg.

TABLE 5

| Formulation composition table | | Example 14 |
|---|---|---|
| Epoxy resin | EP-1 | 10 |
| Curing agent | TEDDM | 3.7 |
| Cured product properties | Elastic modulus [GPa] (50° C.) | 33.3 |
| | Tg [° C.] | 206 |

It was confirmed from the results of Table 5 that the carbon fiber-reinforced composite material in which EP-1 was used as a main agent exhibited a high elastic modulus and high heat resistance (Tg) exceeding 180° C. required for CFRP applications.

INDUSTRIAL APPLICABILITY

The epoxy resin of the present invention has a low viscosity, and the cured product thereof has excellent heat resistance, elastic modulus, water resistance, and flame retardancy. Therefore, the epoxy resin of the present invention is useful for a carbon fiber-reinforced composite material. The carbon fiber-reinforced composite material in which the epoxy resin of the present invention is used is lightweight and has an excellent resistance to external impact, and therefore, can be suitably used for many structural materials such as aircraft members such as a fuselage, main wings, tails, rotor blades, fairings, cowls, doors, seats, and interior materials; spacecraft components such as motor cases and main wings; artificial satellite components such as structures and antennas; automotive components such as outer plates, chassis, aerodynamic components, and seats; railway vehicle components such as structures and seats; and ship components such as hulls and seats.

The invention claimed is:

1. An epoxy resin which is a para-cresol novolac epoxy resin represented by General Formula (1), wherein a content ratio of components represented by n=1 as measured by gel permeation chromatography is at least 2% by area and less than 10% by area, and a content ratio of components represented by n=2 as measured by gel permeation chromatography is at least 10% by area and less than 40% by area,

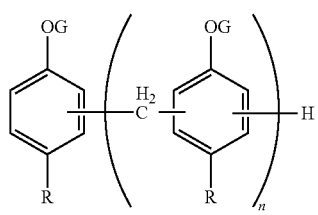

(1)

(in the formula, plural R's each exist independently and represent a C1-6 alkyl group, n represents a real number of 1 to 10, and G represents a substituted or unsubstituted glycidyl group).

2. The epoxy resin according to claim 1 obtained through a reaction between epihalohydrins and para-cresol novolacs represented by General Formula (2),

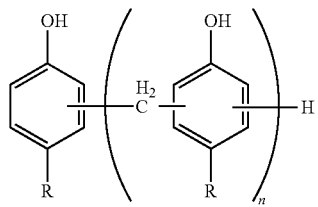

(2)

(in the formula, plural R's each exist independently and represent a C1-6 alkyl group and n represents a real number of 1 to 10, provided that components represented by n=1 and n=2 are present).

3. The epoxy resin according to claim 2,
wherein, in the para-cresol novolacs represented by General Formula (2), a content ratio of components represented by n=1 as measured by gel permeation chromatography is at least 2% by area and less than 10% by area, and a content ratio of components represented by n=2 as measured by gel permeation chromatography is at least 10% by area and less than 50% by area.

4. The epoxy resin according to claim 2,
wherein, in the para-cresol novolacs represented by General Formula (2), a total content of the components represented by n=1 and 3 as measured by gel permeation chromatography is at least 5% by area and less than 30% by area, and a total content of the components represented by n=2 and 4 as measured by gel permeation chromatography is at least 20% by area and less than 65% by area.

5. An epoxy resin composition comprising: the epoxy resin according to claim 1; and a curing agent.

6. The epoxy resin composition according to claim 5, wherein the curing agent is a phenolic curing agent.

7. The epoxy resin composition according to claim 5, which is for a carbon fiber-reinforced composite material.

8. A resin sheet obtained by coating a support base with the epoxy resin composition according to claim 5.

9. A prepreg obtained by impregnating the resin sheet according to claim 8 into carbon fibers.

10. A carbon fiber-reinforced composite material obtained by curing the prepreg according to claim 9.

11. A prepreg obtained by impregnating the epoxy resin composition according to claim 5 into carbon fibers.

12. A carbon fiber-reinforced composite material obtained by curing the prepreg according to claim 11.

13. An epoxy resin which is a para-cresol novolac epoxy resin represented by General Formula (1), wherein a total content of components represented by n=1 and 3 as measured by gel permeation chromatography is at least 5% by area and less than 14% by area, and a total content of components represented by n=2 and 4 as measured by gel permeation chromatography is at least 25% by area and less than 50% by area,

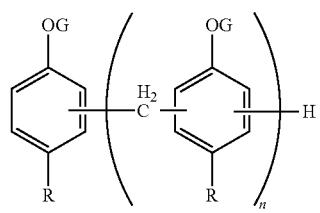

(1)

(in the formula, plural R's each exist independently and represent a C1-6 alkyl group, n represents a real number of 1 to 10, and G represents a substituted or unsubstituted glycidyl group).

* * * * *